(12) United States Patent
Bacigalupo

(10) Patent No.: US 6,289,409 B1
(45) Date of Patent: Sep. 11, 2001

(54) MICROCONTROLLER WITH FLEXIBLE INTERFACE TO EXTERNAL DEVICES

(75) Inventor: Tommaso Bacigalupo, San Jose, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/139,686

(22) Filed: Aug. 25, 1998

(51) Int. Cl.⁷ .................................................. G06F 13/00
(52) U.S. Cl. .......................... 710/129; 710/100; 710/131
(58) Field of Search .................................. 710/129, 100, 710/131, 8, 12, 14, 23

(56) References Cited

U.S. PATENT DOCUMENTS

| | | | |
|---|---|---|---|
| 5,168,177 | * 12/1992 | Shankar et al. | 307/465 |
| 5,317,211 | * 5/1994 | Tang et al. | 307/465 |
| 5,617,040 | * 4/1997 | Matthews | 326/38 |
| 5,717,695 | * 2/1998 | Manela et al. | 371/21.1 |

OTHER PUBLICATIONS

Hitachi Hardware Manual, SH7708 series; Section 10, Bus State Controller (BSC); pp. 184–296; http://www.halsp.hitachi.com/search/tree.

Cypress Preliminary, CYM1838, 128K X 32 Static Ram Module; http://www.cypress.com/cypress/prodgate/modu/cym1838.htm.

Motorola Semiconductor Technical Data, 64K×16 Bit 3.3 V Asynchronous Fast Static RAM, Motorola, Inc. 1996, Document No. MCM6323/D.

Motorola, Multi–Function Peripheral User's Manual, Motorola, Inc. 1995, Document No. MC68HC901.

Siemens, 4M×16–Bit Dynamic RAM (8k, 4k & 2k–Refresh).

* cited by examiner

Primary Examiner—Ario Etienne

(57) ABSTRACT

A semiconductor device is disclosed that has a plurality of I/O pins that are configurable to selectively output three sets of signals selected from the group consisting of (i) a read enable signal and a write enable signal, (ii) a combined read and write enable signal, (iii) a read enable signal and a pair of byte write enable signals, and (iv) a row address strobe signal, and a column address strobe signal.

3 Claims, 11 Drawing Sheets

| ADDRESS RANGE | EXTERNAL DEVICE INFORMATION |
|---|---|
| 0000 ~3FFF | $ED_1$: SRAM, 256K X 16, SEPARATE RD & ER |
| 4000 ~6FFF | $ED_2$: PERIPHERAL, COMBINED RD / WR! |
| A000 ~AFFF | $ED_3$: DRAM |
| CC00 ~DFFF | $ED_4$: DRAM |
| 8000 ~8FFF | $ED_2$: SRAM, COMBINED RD / WR! |

FIG. 5B

MICROCONTROLLER WITH FLEXIBLE INTERFACE TO EXTERNAL DEVICES

BACKGROUND OF THE INVENTION

The present invention relates generally to integrated circuits. More specifically, the present invention relates to microcontrollers that are capable of interfacing with an external device, such as memory devices and multi-functional peripheral devices.

Over the years, various microcontrollers have been developed for various applications. Presently, many microcontrollers are designed to interface with a single type of external memory device, such as a particular type of SRAM or DRAM or a multi-functional peripheral. Additionally, microcontrollers are typically designed to interface with a specific subtype of external device (e.g., different SRAM subtypes having different interface requirements). By way of example, a microcontroller typically includes capabilities for interfacing with either an SRAM configured to receive separate read and write enable signals, an SRAM configured to receive a combined read and write enable signal, or an SRAM configured to receive a read enable signal and more than one write enable signal.

FIG. 1A is a diagrammatic representation of an external device 100 of a first subtype (Type I) and associated I/O pins. Motorola's MCM6323, 64Kx16 Bit, 3.3 V, Asynchronous Fast Static RAM is an example of a Type I external device, a specification of which is included in Appendix A as Item 1 (incorporated herein by reference in its entirety). As shown, the Type I external device 100 is configured to receive a plurality of address (ADR) signals, a plurality of data signals (DB), a chip select (CS!) signal, a read (RD!) enable signal, a write (WR!) enable signal, a byte enable low (BEL!) signal, and a byte enable high (BEH!) signal. (An "!" denotes that the signal is enabled at a low state). The BEL! and BEH! are optional, and some Type I external devices do not include such inputs.

These signals that are received by the external device 100 provide many functions that are required for accessing memory within the external device 100. The CS! signal is required to enable and initiate access to the external device 100. The RD! signal is needed to enable and initiate a read from the external device 100, and the WR! signal is needed to enable and initiate a write to the external device 100. When a RD! signal is provided to the external device that indicates a read operation is to be performed, the external device 100 outputs data onto the DB. Specifically, the data is output from a memory location within the external device 100 that is specified by the received ADR signals. Conversely, when a WR! is provided that indicates a write operation is to be performed, the external device 100 receives data via the DB into the specified memory location. The BEL! and BEH! are optional, and some Type I external devices do not include such inputs. Additionally, some Type I external devices include more than one pair of byte enable signals.

FIG. 1B are typical timing diagrams for I/O signals that are required as input into the Type I external device 100 of FIG. 1A to enable a read operation. As shown, the timing diagrams include a plurality of address (ADR) signals, a chip select (CS!) signal, a read (RD!) enable signal, a write (WR!) enable signal, a byte enable low (BEL!) signal, and a byte enable high (BEH!) signal. As shown, the ADR signals transition from a first value 102 to a second value 106 during period 104. The CS! signal transitions from a high value 108 to a low value 112 during a portion of the second ADR value. When the CS! signal is at a low value, access to the external device 100 is enabled. After the external device 100 is enabled, the RD! signal transitions from a high value 114 to a low value 118 to enable a read operation. The WR! signal remains at a high value 120 such that a write operation is not enabled.

Additionally, one or both of the byte enable signals (e.g., BEL and BEH) may also transition from a high state 122 to a low state 124 to enable the read operation only for certain bytes of data. For example, if the BEL signal remains high and the BEH signal transitions to a low value, data is read only from an upper byte of the specified memory location and not from the lower byte. That is, only the output drivers of the enabled bytes are activated within the external device 100.

FIG. 1C are typical timing diagrams for I/O signals that are required as input into the external device 100 of FIG. 1A to enable a write operation. As shown, the I/O signals for a write operation are similar to the I/O signals for a read operation. However, the WR! signals transitions from a high value 166 to a low value 170 to enable the write operation, and the RD! signal remains at a high state 164.

Additionally, one or both of the byte enable signals (e.g., BEL and BEH) may also transition from a high state 172 to a low state 176 to enable the write operation only for certain bytes of data. For example, if the BEL signal remains high and the BEH signal transitions to a low value, data is written only into an upper byte of the specified memory location and not into the lower byte.

FIG. 2A is a diagrammatic representation of an external device 200 of a second subtype (Type II) and associated I/O pins. Motorola's MC68HC901 Multi-Function Peripheral is an example of a Type II external device, a specification of which is included in Appendix A as Item 2 (incorporated herein by reference in its entirety). As shown, Type II is configured to receive a plurality of address (ADR) signals, a plurality of data signals (DB), a chip select (CS!) signal, a combined read and write (RD/WR!) enable signal, a byte enable low (BEL!) signal, and a byte enable high (BEH!) signal.

The BEL! and BEH! are merely illustrative, and some external devices may have a different number of byte enable inputs. For example, some external devices (e.g., a 32 bit external device) require more than one pair of byte enable signals, while other external devices (e.g., an 8 bit external device) only require a single byte enable (or data enable) signal.

The Type II device has different read and write mechanisms than the Type I external device. The Type II device requires a combined read and write enable (RD/WR!) signal, while the Type I device requires separate read and write enable (RD! and WR!) signals.

FIG. 2B are typical timing diagrams for I/O signals that are required as input into the external device of FIG. 2A to enable a read operation. As shown, the CS! signal transitions from a high state 208 to a low state 212 to enable access to the Type II external device. Additionally, the RD/WR! signal remains at a high value 214 to enable the read operation. Additionally, one or both of the byte enable signals (e.g., BEL and BEH) may also transition from a high state 216 to a low state 218 to enable the read operation only for the indicated bytes(s).

FIG. 2C are typical timing diagrams for I/O signals that are required as input into the external device of FIG. 2A to enable a write operation. As shown, the I/O signals for a write operation are similar to the I/O signals for a read operation. However, the RD/WR! transitions from a high state 264 to a low state 267 to enable a write operation. Additionally, one or both of the byte enable signals (e.g., BEL and BEH) may also transition from a high state 266 to a low state 270 to enable the write operation only for the indicated bytes(s).

FIG. 3A is a diagrammatic representation of an external device 300 of a third subtype (Type III) and associated I/O pins. Cypress' CYM1838, 128Kx32 Static RAM Module is an example of a Type III external device, a specification of which is included in Appendix A as Item 3 (incorporated herein by reference in its entirety). As shown, Type III is configured to receive a plurality of address (ADR) signals, a plurality of data signals (DB), a chip select (CS!) signal, a read (RD!) enable signal, a write enable low (WEL!) signal, and a write enable high (WEH!) signal. Some Type III external devices include more than one pair of write enable signals.

The Type III device has different read and write mechanisms than the Type I and Type II external devices. The Type III device requires a RD! signal to enable a read instruction, and separate write enable signals (e.g., WEH and WEL) to specify and enable a write to one or more bytes of the specified memory location of the Type III external device.

FIG. 3B are typical timing diagrams for I/O signals that are required as input into the external device of FIG. 3A to enable a read operation. As shown, the CS! signal transitions from a high state 308 to a low state 312 to enable access to the Type III external device. Additionally, the RD! signal transitions from a high value 314 to a low value 318 to enable the read operation. The WEH and WEL signals remain at high states 320 and 322 during a read operation.

FIG. 3C are typical timing diagrams for I/O signals that are required as input into the external device of FIG. 3A to enable a write operation. As shown, the I/O signals for a write operation are similar to the I/O signals for a read operation. However, the RD! remains at a high state 364. Additionally, one or both of the write enable signals (e.g., WEL and WEH) transition from a high state (e.g., 366 and 372) to a low state (e.g., 370 and 376) to enable a write operation only to the indicated bytes(s).

FIG. 4A is a diagrammatic representation of an external device 400 of a fourth subtype (Type IV) and associated I/O pins. Siemens' HYB 3164 (5/6)160AT(L)-40/-50/-60 4 M×16 DRAM is an example of a Type IV external device, a specification of which is included in Appendix A as Item 4 (incorporated herein by reference in its entirety). As shown, Type IV is configured to receive a plurality of address (ADR) signals, a plurality of data signals (DB), an upper column address strobe (UCAS!) signal, a lower address column strobe (LCAS!) signal, a read (RD!) enable signal, a write (WR!) enable signal, and a row address strobe (RAS!) signal. Some Type IV external devices require only a single CAS! signal, while other Type IV external devices require more than one pair of CAS! signals.

The RAS signal indicates when to read the row address value from the ADR signals, and the UCAS and LCAS indicate when to store the column address from the ADR signals within the external device 400. For example, a falling edge of the RAS! signal indicates when to store the row ADR values within internal registers (not shown) of the external device 400. Likewise, a falling edge of one or both of the CAS! signals indicate when to store the column ADR values within internal registers (not shown) of the external device 400. One or both of the UCAS and LCAS signals may be used to indicate which bytes to read from or write to within the external device 400. The RD! signal is used to enable a read from the external device 400, and the WR! signal is to enable a write to the external device 400.

FIG. 4B are timing diagrams for I/O signals that are typically input into the external device 400 of FIG. 4A during a read operation. As shown, the timing diagrams include address (ADR) signals, a plurality of data signals (DB), an upper column address strobe (UCAS!) signal, a lower address column strobe (LCAS!) signal, a read (RD!) enable signal, a write (WR!) enable signal, and a row address strobe (RAS) signal.

As shown, row address values (e.g., 404) and column address values (e.g., 406) are multiplexed onto the ADR signals. For example, a first row address 404 is received by the external device 400, a first column address 406 is then received, a second row address 410 is then received, etc. The RAS! signal transitions from a high value 412 to a low value 416 to indicate that the row address value may be read by the external device. One or both of the CAS! signals transition from a high value 418 to a low value 422 to indicate that one or both bytes of the column address may be read by the external device. If the UCAS! signal is low, the upper byte of data is read and if the LCAS! signal is low, the lower byte of data is read.

The RD! signal transitions from a high value 424 to a low value 428 to enable a read operation. The WR! signal remains at a high value 430 such that a write operation is not enabled. Alternatively, the Type IV external device may include a combined read and write enable signal, instead of separate read and write enable signals.

FIG. 4C are typical timing diagrams for I/O signals that are required as input into the external device 400 of FIG. 4A to enable a write operation. As shown, the I/O signals for a write operation are similar to the I/O signals for a read operation. However, the WR! signals transitions from a high value 476 to a low value 480 to enable the write operation, and the RD! signal remains at a high state 474.

Although a particular microcontroller typically meets the interfacing requirements for one or two types of external device, conventional microcontrollers are typically not capable of interfacing with more than one type of external device. For example, a microcontroller may be configured to provide separate read and write signals for a Type I external device, but not a combined read and write signal for a Type II external device.

As a consequence of the limited interface capabilities of conventional microcontroller configurations, system designers who desire to couple a single microcontroller unit with more than one type of external device must implement additional hardware (or "glue logic") that is custom designed to provide interface capabilities for more than one type of external device. For example, a microcontroller that is configured to only provide separate read and write signals requires additional glue logic to combine the read and write signals for interfacing with a Type II external device.

In view of the foregoing, there is a need for an improved microcontroller that is capable of interfacing with multiple external devices without the addition of external glue logic.

SUMMARY OF THE INVENTION

Accordingly, the present invention provides an apparatus and method for interfacing with more than one type of external device. In general, the present invention provides methods and apparatus for automatically switching between interfacing with one type of external device to interfacing with another type of external device.

In one embodiment, a semiconductor device is disclosed that has a plurality of I/O pins that are configurable to selectively output three sets of signals selected from the group consisting of (i) a read enable signal and a write enable signal, (ii) a combined read and write enable signal, (iii) a read enable signal and a pair of byte write enable signals, and (iv) a row address strobe signal, and a column address strobe signal.

In one alternative embodiment, the I/O pins are also configurable to selectively output a plurality of byte enable signals. A selected one of the I/O pins is configurable to output either a selected one of the pair of byte write enable signals or the byte enable signal, and the selected I/O pin is also configurable to output an address signal, wherein the address signal is a least significant address bit. In another embodiment, the I/O pins are also configurable to selectively output a plurality of chip select signals, wherein a selected one of the I/O pins is configurable to output either the chip select signal or the row address strobe signal. The selected I/O pin is also configurable to output an address signal, wherein the address signal is a most significant address bit.

In an alternative embodiment, a semiconductor device is disclosed having a plurality of I/O pins that are configurable to output a first set of signals that include a row address strobe (RAS) signal and a column address strobe (CAS) and a second set of signals selected from a group consisting of (i) a chip select signal, a read enable signal, and a write enable signal and (ii) a chip select signal, a combined read and write enable signal.

In yet another embodiment, a semiconductor device is disclosed having a plurality of I/O pins that are configurable to output a first and a second set of signals selected from the group consisting of (i) a chip select signal, a read enable signal, and a write enable signal, (ii) a chip select signal, a combined read and write enable signal, and (iii) a chip select signal, a read enable signal and a pair of byte write enable signals, wherein the first set of signals is different than the second set of signals.

The present invention has several advantages. For example, the microcontroller of the present invention provides a flexible mechanism for interfacing with external devices of various types. Additionally, the multiplexing of particular interfacing functions on certain pins provides efficient use of the microcontroller's pins. For example, by multiplexing the least significant address bit with a byte control function on one pin, pin use is maximized since these two functions are usually not needed at one time.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 3C are typical timing diagrams for I/O signals that are required as input into the external device of FIG. 3A to enable a write operation.

FIG. 5B is a diagrammatic representation of the external device look-up table of FIG. 5A in accordance with one embodiment of the present invention.

DETAILED DESCRIPTION OF THE PREFERRED EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
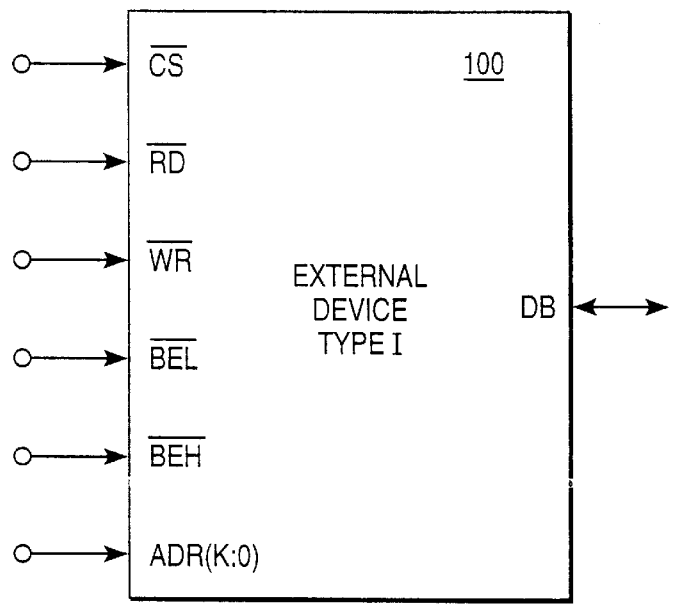
FIG. 1A is a diagrammatic representation of an external device of a first subtype (Type I) and associated I/O pins.
Figure 1B:
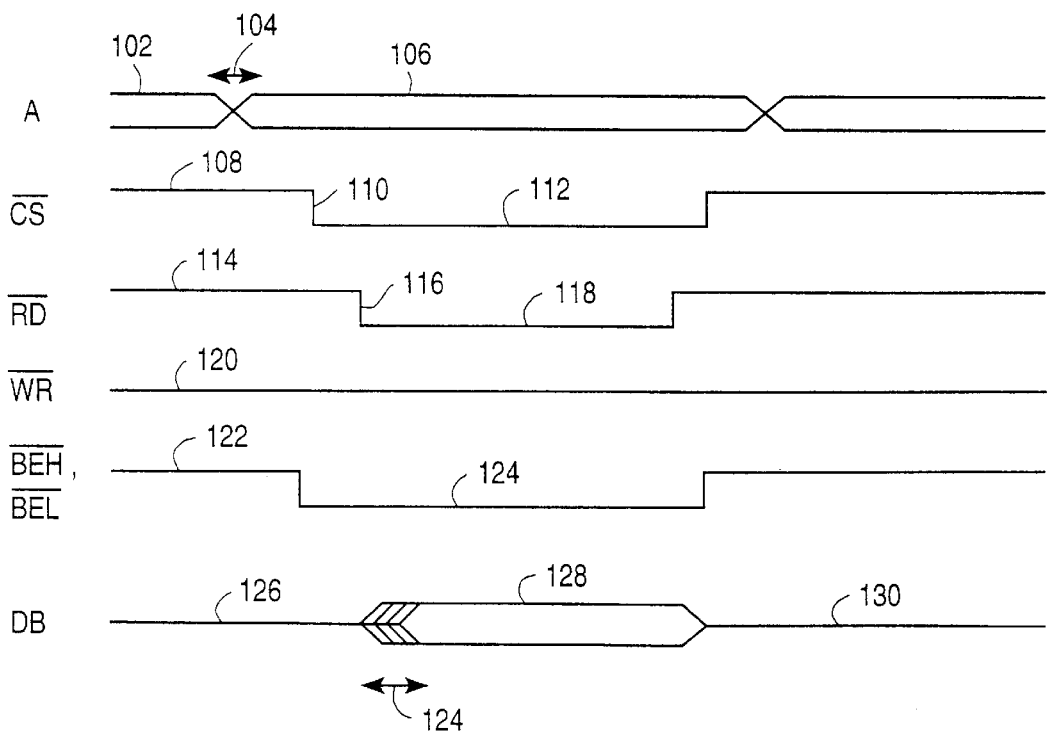
FIG. 1B are typical timing diagrams for I/O signals that are required as input into the external device of FIG. 1A to enable a read operation.
Figure 1C:
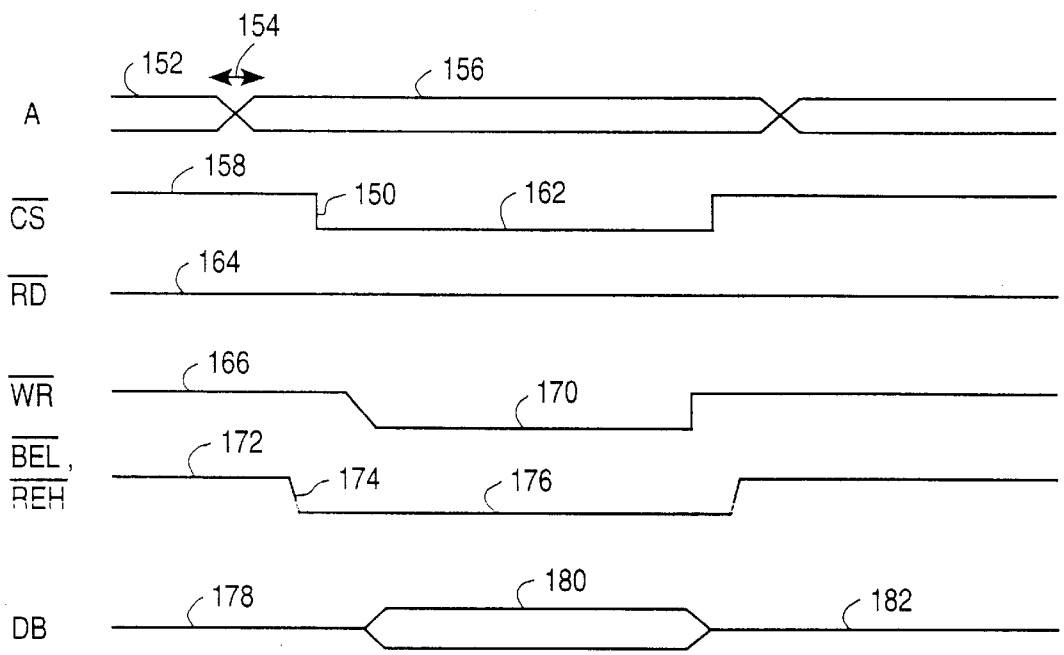
FIG. 1C are typical timing diagrams for I/O signals that are required as input into the external device of FIG. 1A to enable a write operation.
Figure 2A:
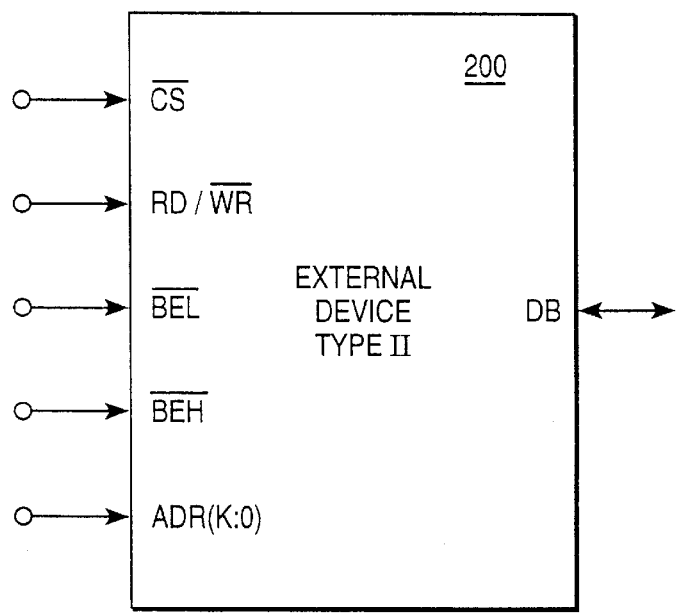
FIG. 2A is a diagrammatic representation of an external device of a second subtype (Type II) and associated I/O pins.
Figure 2B:
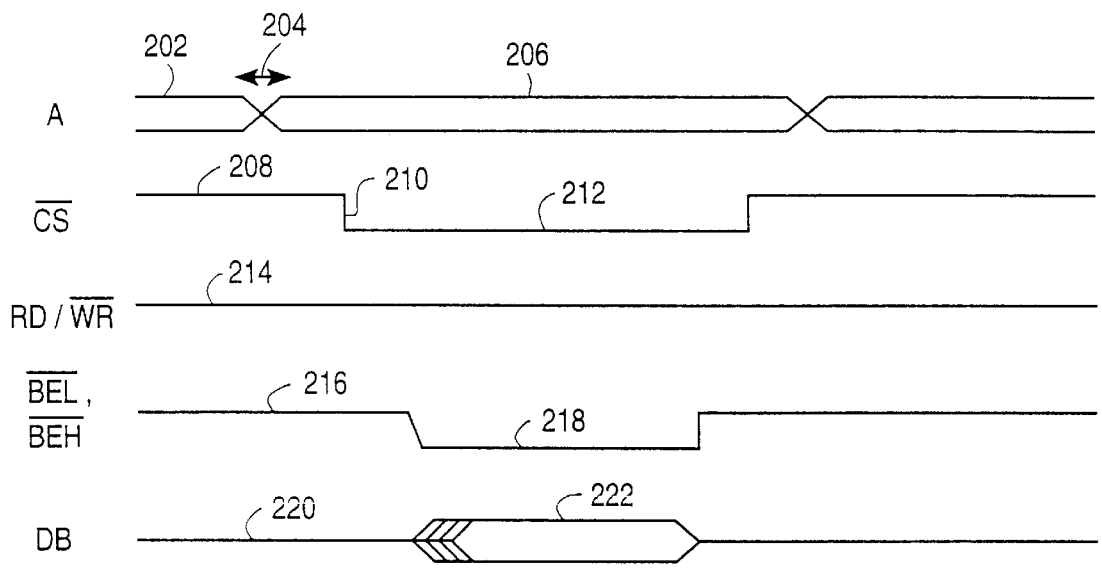
FIG. 2B are typical timing diagrams for I/O signals that are required as input into the external device of FIG. 2A to enable a read operation.
Figure 2C:
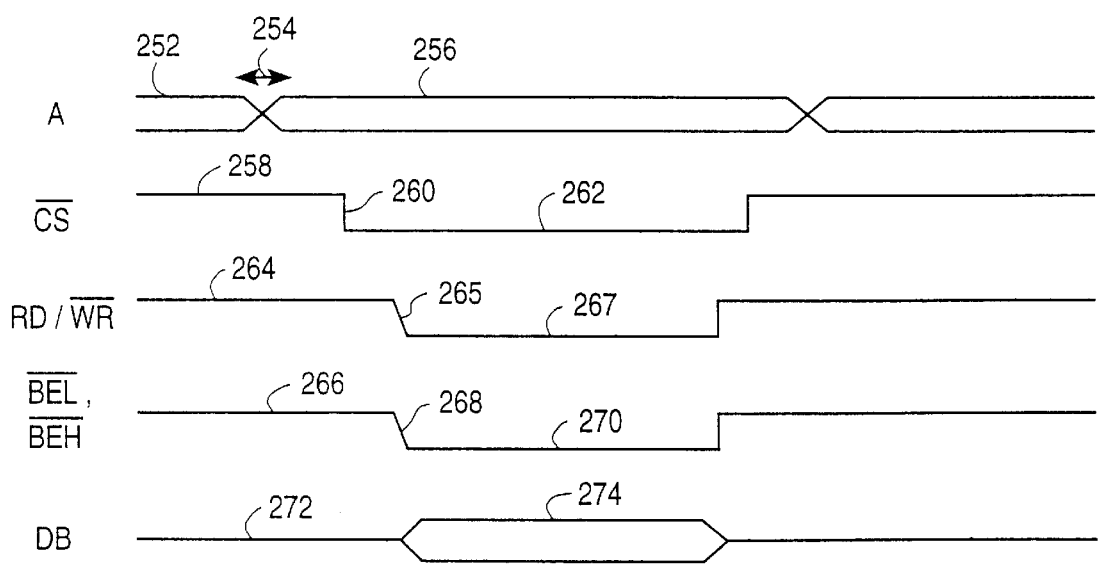
FIG. 2C are typical timing diagrams for I/O signals that are required as input into the external device of FIG. 2A to enable a write operation.
Figure 3A:
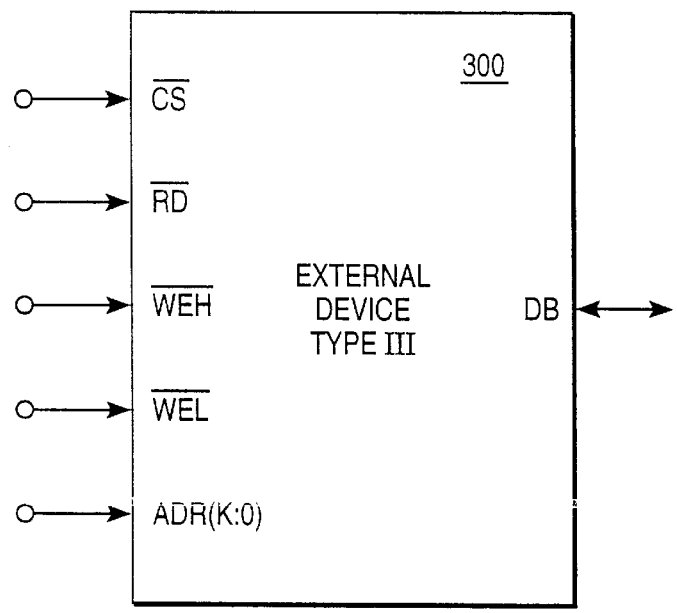
FIG. 3A is a diagrammatic representation of an external device of a third subtype (Type IIII) and associated I/O pins.
Figure 3B:
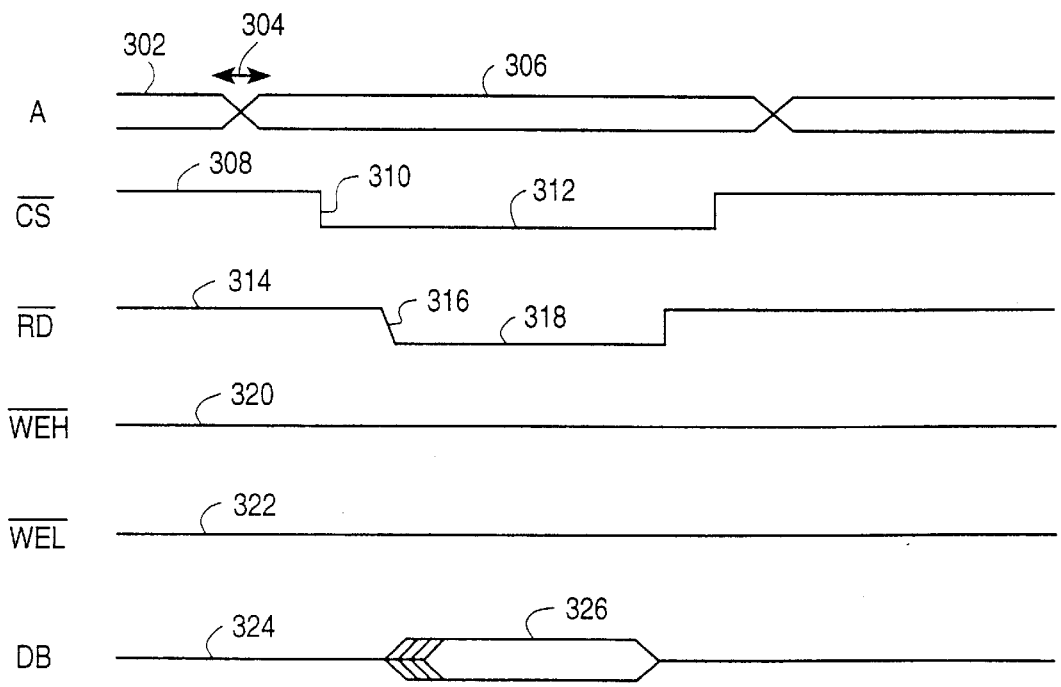
FIG. 3B are typical timing diagrams for I/O signals that are required as input into the external device of FIG. 3A to enable a read operation.
Figure 3B:
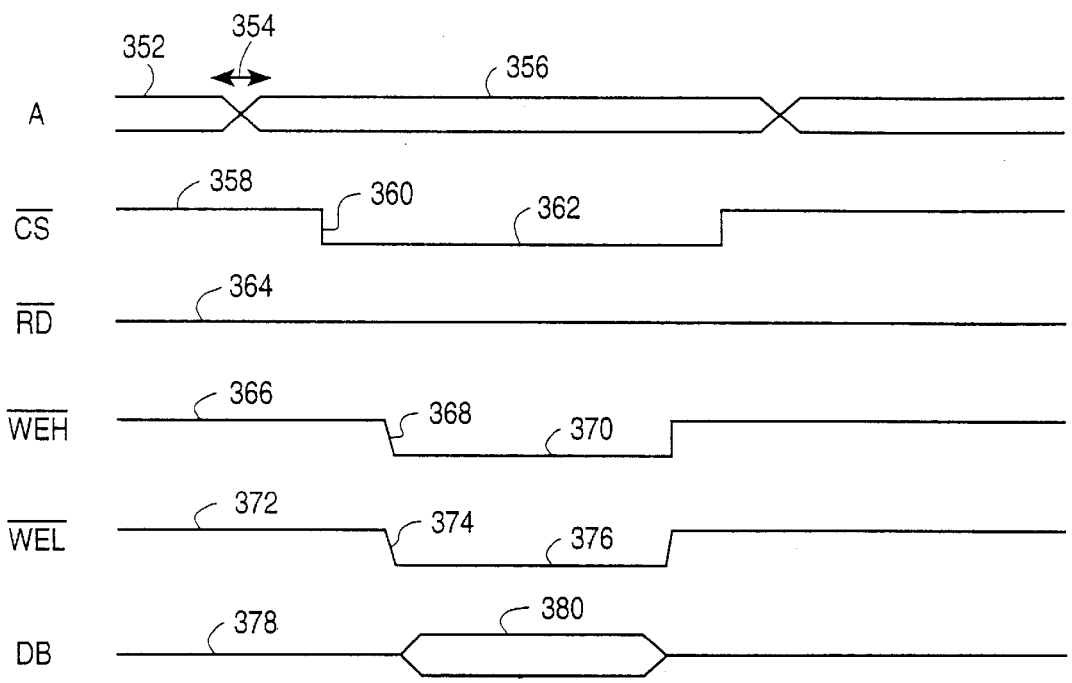
Figure 4A:
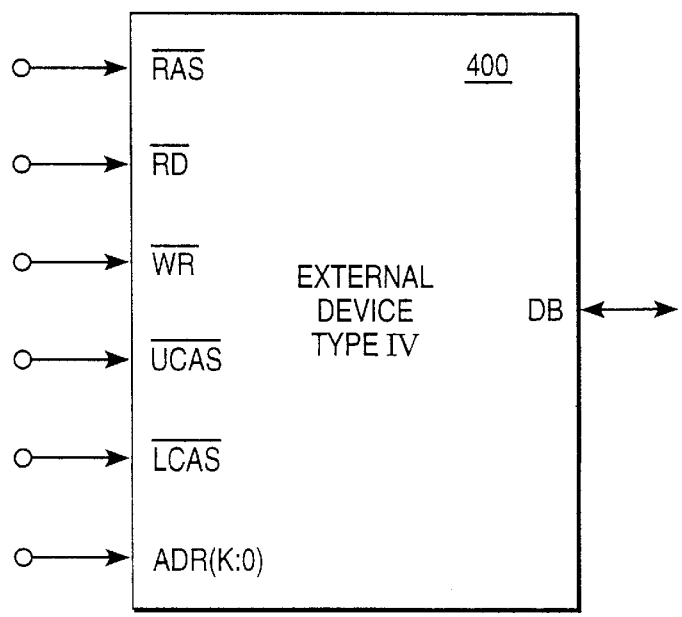
FIG. 4A is a diagrammatic representation of an external device of a fourth subtype (Type IV) and associated I/O pins.
Figure 4B:
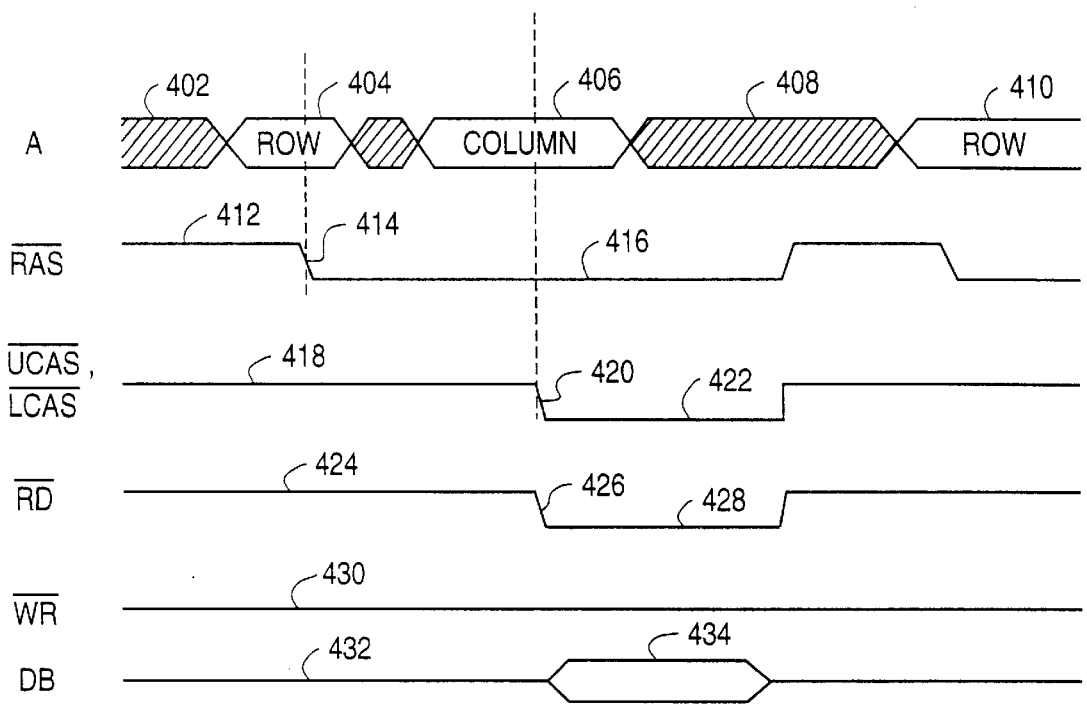
FIG. 4B are timing diagrams for I/O signals that are typically input into the external device of FIG. 4A during a read operation.
Figure 4C:
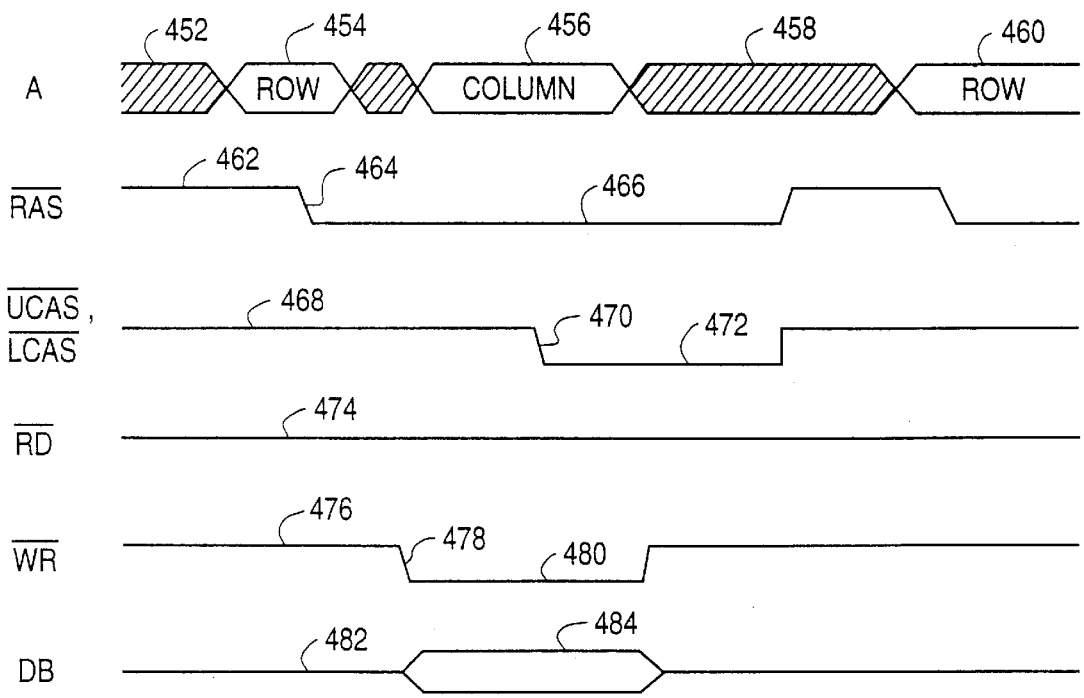
FIG. 4C are typical timing diagrams for I/O signals that are required as input into the external device of FIG. 4A to enable a write operation.
Figure 5A:
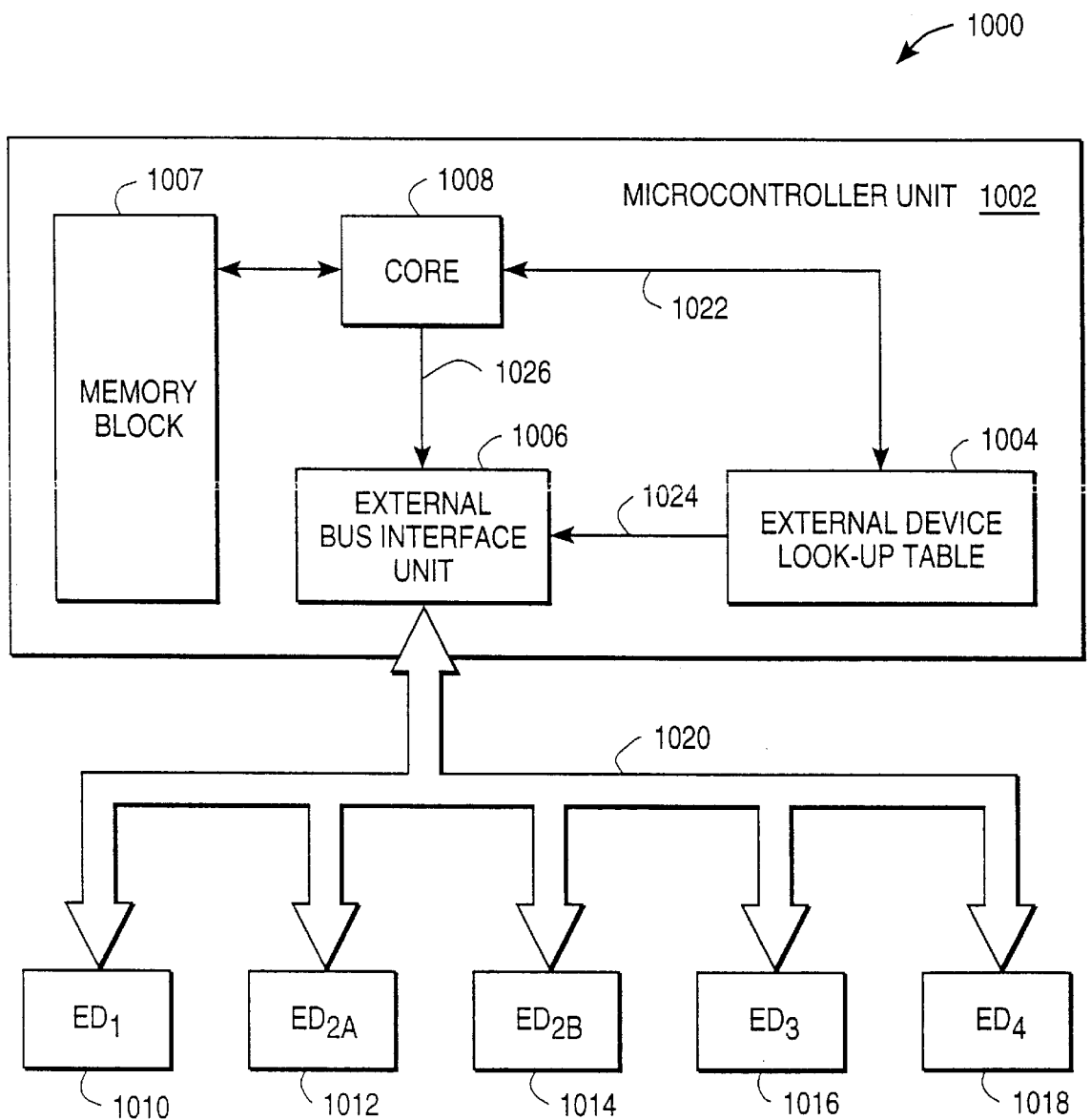
FIG. 5A is a diagrammatic representation of a microcontroller coupled with a plurality of external devices in accordance with one embodiment of the present invention.

FIG. 5A is a diagrammatic representation of a microcontroller 1002 coupled with a plurality of external devices 1010 through 1018 in accordance with one embodiment of the present invention. As shown, the microcontroller 1002 includes an external bus interface unit (EBU) 1006, an external device look-up table 1004, a memory block 1007, and a processing core 1008. The microcontroller 1002 may include other internal components (such as timer blocks, port control blocks, and other peripheral control blocks) that are not shown so as not to obscure the invention.

As shown, the microcontroller 1002 is coupled to a Type I external device 1010, two Type II external devices 1012 and 1014, a Type III external device 1016, and a Type IV external device 1018. As described above, each of the external device types has different interfacing requirements. For example, a Type I external device requires separate read and write enable signals, while a Type II external device requires a combined read and write enable signal. A Type III external device requires multiple write enable signals for selectively enabling a write operation to one or more bytes of data. A Type IV external device requires a row address strobe signal and at least one column address strobe signal, as well as read and write enable signals.

Although the microcontroller 1002 is described as being able to selectively interface with four different types of external devices, of course the microcontroller may be configured to interface with any suitable number and combination of external device types. For example, a microcontroller may be designed to selectively interface with two external device types. Additionally, the microcontroller may be designed to also selectively provide appropriately timed interface signals to external devices having the same type but having different interface signal timing requirements. For example, as shown, the two Type II external devices may have different interface signal timing requirements, and the microcontroller 1002 may be configured to automatically provide the required differently timed interface signals to each type II external device.

Returning to FIG. 5A, the core 1008 of the microcontroller 1002 is arranged to receive and implement programming operations that may be stored within the memory block 1007, for example, or alternatively within an external device. In one embodiment, when the core 1008 receives a particular program instruction, microcode instructions within the core 1008 are retrieved and used to implement the particular program instruction. By way of example, the core may implement a write operation (e.g., an "LDM" instruction) by sending control signals to a memory decoder of memory block 1007 such that a write operation is initiated within the memory block 1007. Alternatively, the microcontroller 502 may be configured to access external memory, whereby a write instruction results in data being written to an external memory address of one of the plurality of external devices that are coupled to the microcontroller 1002. Likewise, data may be read from a particular external device when a read operation is asserted to the particular external device.

The EBU 1006 is arranged to implement program operations that require access, such as a read or a write operation, to a particular external device. In other words, EBU 1006 is further arranged to provide appropriate interface signals to the particular external device. Additionally, EBU 1006 is further arranged to selectively interface with various external device types as required by the core 1008.

When a program operation indicates a particular external device is to be accessed, EBU 1006 receives one or more core signals 1026 from the core 1008. The core signals 1026 may include any suitable control signals for accessing external devices, such as data, read enable, write enable and/or address signals. External device information 1024 is then provided to EBU 1006 from the external device look-up table 1004 based on the one or more core signals 1026.

Although the present invention is described as implementing a programmable look-up table for providing external device information, of course, any suitable mechanism may be implemented for providing external device information, such as timing information for interface signals to particular external device types.

In this embodiment, the external device look-up table 1004 may include external device information 1024 for each set of core signals 1026 that are associated with a particular external device. In other words, the external device information may be configured to include any suitable information that facilitates EBU 1006 in providing appropriate interface signals to the particular external device.

The external device information may be arranged within the look-up table in any suitable manner such that information is accessible for each particular external device type. FIG. 5B is a diagrammatic representation of the external device look-up table 1004 of FIG. 5A in accordance with one embodiment of the present invention. As shown, the table 1004 includes an address range column 1050 and an external device information column 1052.

In one embodiment, each set of external device information 1052 has an associated range of addresses 1050. For example, external device information 1052*a* for a Type I external device are associated with hexadecimal addresses 0000 through 3FFF (1050*a*). Similarly, external device information 1052*b* for a Type II external device are associated with addresses 4000 through 6FFF (1050*b*).

Preferably, the table 1004 is programmable (e.g., by core signals 1022) and may be programmed to provide external device information for any suitable number of external device types that may be accommodated by the microcontroller's pins. For example, the microcontroller 502 may include seven separate external device enable pins for interfacing with seven different external devices. In this example, the table 1004 may be programmed with up to seven sets of external device information with each set having an associated range of addresses.

Additionally, the table 1004 may be programmed with more than one set of information for a particular type of external device. As shown in FIG. 5B, two different information sets (1052*b* and 1052*e*) for a Type II external device are associated with two different address ranges (1050*b* and 1050*e*). Each of the information sets may include different timing parameters for the same type of external device or the same timing parameters. Likewise, each of the information sets may include the same or different timing parameters for different external device types.

Each information set within table 1004 may be accessed based on a particular address value. In one embodiment, the core signals 1026 from core 1008 may include an address value that is used by EBU 1006 to access external device information from table 1004. For example, when the address value is hexadecimal 2010, external device information for a Type I external device is obtained from table 1004. By way of a specific example, when a program operation indicates a write to or read from an address 2010, EBU obtains external device information from table 1004 that indicates that a Type I SRAM device having separate read and write signals is to be accessed by the microcontroller.

Returning to FIG. 5A, after obtaining the external device information 1024 from table 1004, EBU 1006 may then determine which interfacing signals to provide to which external device. For example, EBU 1006 provides a separate read and write enable signal, a chip select signal, address signals, data signals, and possibly byte enable signals to a Type I external device 1010. Any suitable circuitry may be implemented for providing the interface signals, which circuitry is well known by those skilled in the art. In sum, EBU 1006 selectively provides interface signals to the appropriate external device based on external device information 1024 from the external device look-up table 1004 that is based on at least some of the core signals 1026 that are provided to EBU 1006.

The microcontroller may include any suitable configuration of interface pins for interfacing with various external device types. For example, for interfacing with Type I through Type IV external devices, the microcontroller may include separate read and write enable pins, separate byte write enable pins, separate byte enable pins, a plurality of row and column address pins, a plurality of chip select pins, address pins, and data pins.

Figure 6:
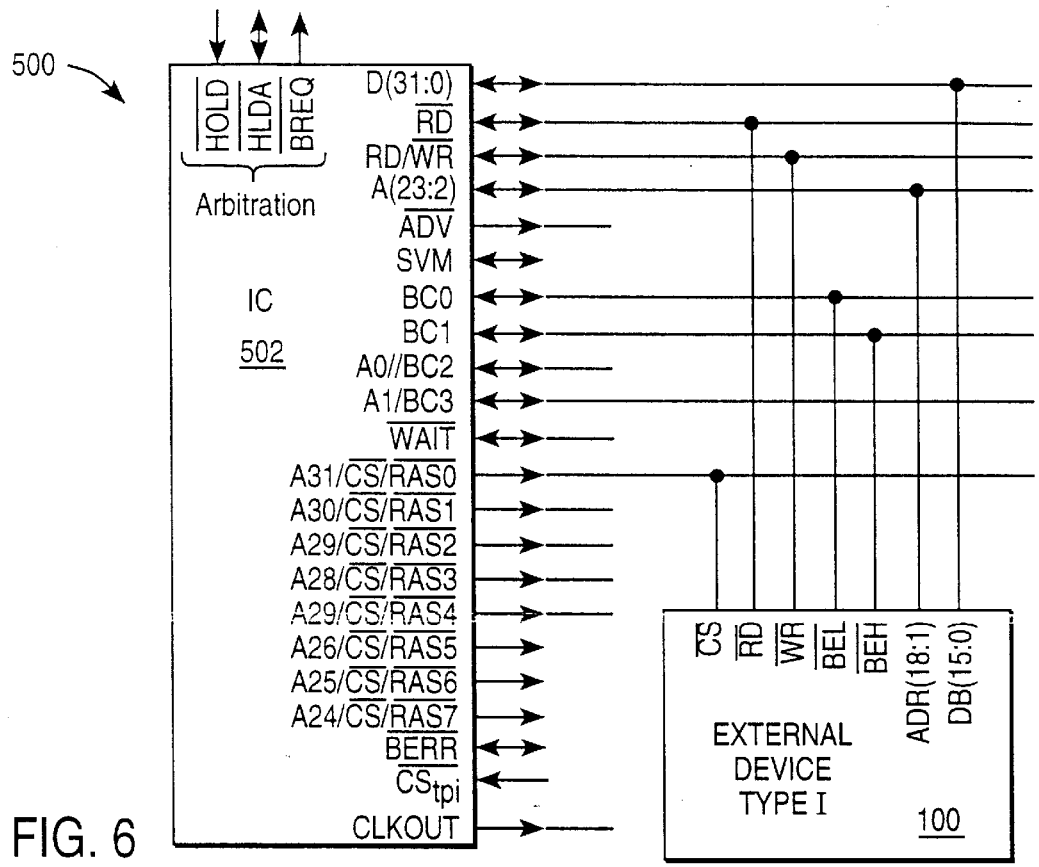
FIG. 6 is a diagrammatic representation of a microcontroller that is coupled with a Type I external device in accordance with one embodiment of the present invention.

FIG. 6 is a diagrammatic representation of a microcontroller 502 that is coupled with a Type I external device 100 in accordance with one embodiment of the present invention. As shown, the microcontroller 502 includes a plurality of data pins D(31:0) for interfacing with corresponding data pins D(15:0) of the external device 100. The microcontroller 502 may include any suitable number of data pins that are appropriate for interfacing with various external devices with different memory sizes.

The microcontroller 502 also includes a RD! pin that is coupled to the RD! pin of the external device 100, and a RD/WR! pin that is coupled to the WR! pin of the external device 100. The RD/WR! pin may be configured to automatically provide a WR! function when interfacing with a Type I external device. Techniques and apparatus for configuring this function and other microcontroller interfacing functions are further described above in reference to FIGS. 5A and 5B.

Byte control pins (BC0 and BC1) of the microcontroller 502 may be coupled to the byte enable pins (BEL and BEH) of the external device 100, and a chip select pin (CS!) of the microcontroller 502 may be coupled to the CS! pin of the external device 100. These microcontroller 502 pins are configurable to provide byte control and chip select functions to the external device.

Each CS! of the microcontroller 502 is multiplexed with an address pin (e.g., A31) and a row address strobe (e.g., RAS0!) pin. This multiplexed pin may be alternatively configured to provide a RAS! function to a RAS! pin of a Type IV external device, a chip select function to a CS! pin of any Type I through Type III external devices, or an address signal to an external device that requires one or more extra address signals in addition to address pins A0 through A23, which addresses are provided on other pins of the microcontroller 502.

The microcontroller 502 also includes byte control pins BC0 through BC3 that may be used for various sized external devices. Any suitable number of byte control pins may be utilized for providing byte selection capabilities for various sized external devices. For example, if four byte control pins are provided (e.g., BC0 through BC3), BC0 and BC1 may be configured to select one or both bytes of a sixteen bit external device (as shown). Likewise, BC0 through BC2 may be configured to select one or more bytes of a 24 bit external device, and BC0 through BC3 may be configured to select one or more bytes of a 32 bit external device.

The microcontroller 502 also includes a first set of address pins (A23 through A2) that are capable of interfacing with all but the two least significant address bits of the external device. Preferably, the microcontroller 502 includes a least significant address pin (A0) that is multiplexed with the byte control pin (e.g., BC3) that may be used for interfacing with the external device having one byte of data. Likewise, a next to the least significant address pin (A1) is multiplexed with the byte control pin (e.g., BC2) for interfacing with the external device having the one or two bytes of data.

By multiplexing the upper byte control pins with the least significant address bits, the present invention represents an efficient use of microcontroller pins. For example, when the microcontroller 502 is configured to interface with an external device that has data that is at least four bytes wide and that allows byte selection, these multiplexed pins of the microcontroller 502 may be configured to provide byte control functions BC2 and BC3. Fortunately, four byte external devices that allow or require byte selection do not require address bits A0 and A1. Thus, since the lower address functions are not required for the four byte external devices, the lower address pins of the microcontroller 502 are still utilized if they are multiplexed with byte control functions. The following Table 1 summarizes a few examples of how the byte control pins may be configured (note that a "byte" is 8 bits wide, a "halfword" is 16 bits, and a "word" is 32 bits):

TABLE 1

| Width of External Device | A1/BC3! Function | A0/BC2! Function | BC1! Function | BC0! Function |
|---|---|---|---|---|
| 32-bit device with byte selection capability | byte control for D31–D24 | byte control function for D23–D16 | byte control function for D15–D8 | byte control function for D7–D0 |
| 32-bit device with halfword selection capability | byte control for D31–D16 | | byte control for D15–D0 | |
| 32-bit device with word selection capability | byte control for D31–D0 | | | |
| 16-bit device with byte selection capability | A1 | not used | byte control for D15–D8 | byte control for D8–D0 |
| 16-bit device with halfword selection capability | A1 | not used | byte control for D15–D0 | |
| 8-bit device with byte selection capability | A1 | A0 | not used | not used |

As shown in FIG. 6, the external device 100 requires eighteen address signals (A18 through A1) and sixteen data signals for a total of 256 k times two bytes of data. When the BC0 and BC1 pins of the microcontroller 502 are configured to select between the upper and lower data bytes of each address, the least significant address bit A0 is not required. Thus, the multiplexed pin A0/BC2 is unused, while the multiplexed pin A1/BC3 and address pins A2 through A17 of the microcontroller 502 are interfaced, respectively, with the address pins A2 through A18 of the external device 100.

Figure 7:
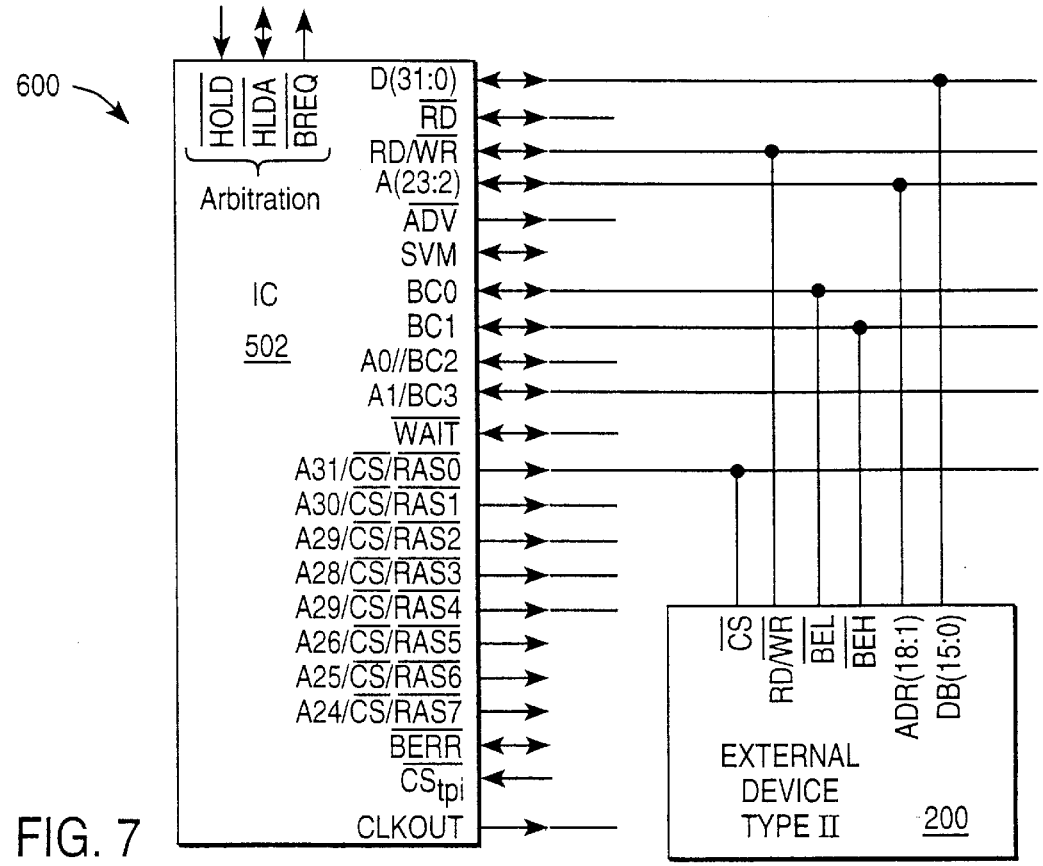
FIG. 7 is a diagrammatic representation of the microcontroller of FIG. 6 that is coupled with a Type II external device in accordance with one embodiment of the present invention.

FIG. 7 is a diagrammatic representation of the microcontroller 502 of FIG. 6 that is coupled with a Type II external device 200 in accordance with one embodiment of the present invention. As shown, the CS! pins of the microcontroller 502 are coupled to the CS! pin of the external device 200, the address pins A1 through A18 are coupled to the address pins A1 through A18 of the external device 200, and the data pins D15 through D0 are coupled to the data pins D15 through D0 of the external device 200.

Additionally, the microcontroller 502 RD/WR! pin is coupled to the combined RD/WR! pin of the external device 200. The RD/WR! pin provides a combined RD/WR! function when configured to interface with a Type II external device. Note that the RD! pin of the microcontroller 502 is not coupled with the external device 200.

Figure 8:
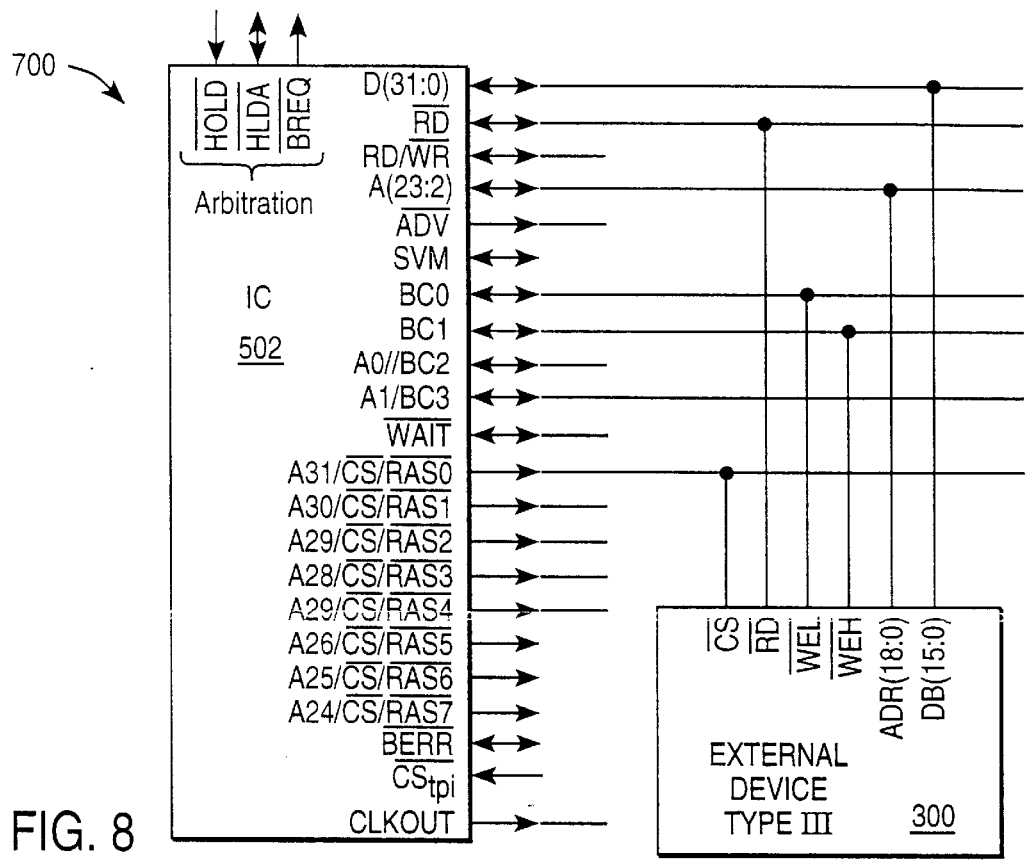
FIG. 8 is a diagrammatic representation of the microcontroller of FIG. 6 that is coupled with a Type III external device in accordance with one embodiment of the present invention.

FIG. 8 is a diagrammatic representation of the microcontroller 502 of FIG. 6 that is coupled with a Type III external device 300 in accordance with one embodiment of the present invention. As shown, the CS! pins of the microcontroller 502 are coupled to the CS! pin of the external device 300, the RD! pin of the microcontroller 502 is coupled to the RD! pin of the external device 300, the address pins A1 through A18 are coupled to the address pins A1 through A18 of the external device 300, and the data pins D15 through D0 are coupled to the data pins D15 through D0 of the external device 300.

The BC0 and BC1 pins of the microcontroller 502 are coupled to the lower write enable pin (WEL!) and the upper write enable pin (WEH!) of the external device 300. The BC0 and BC1 may be configured to provide a pair of write enable signals WEL! and WEH! to enable a write to one or both of the two data bytes of the external device 300. Any suitable number of byte control pins (e.g., BC0 through BC3) may be provided for selectively enabling one or more byte writes to an external device. The number of byte control signals depends on the desired maximum number of bytes that are to be accessed within external devices. As shown, the microcontroller 502 provides four byte control signals for selectively enabling one or more of four bytes of data.

Figure 9:
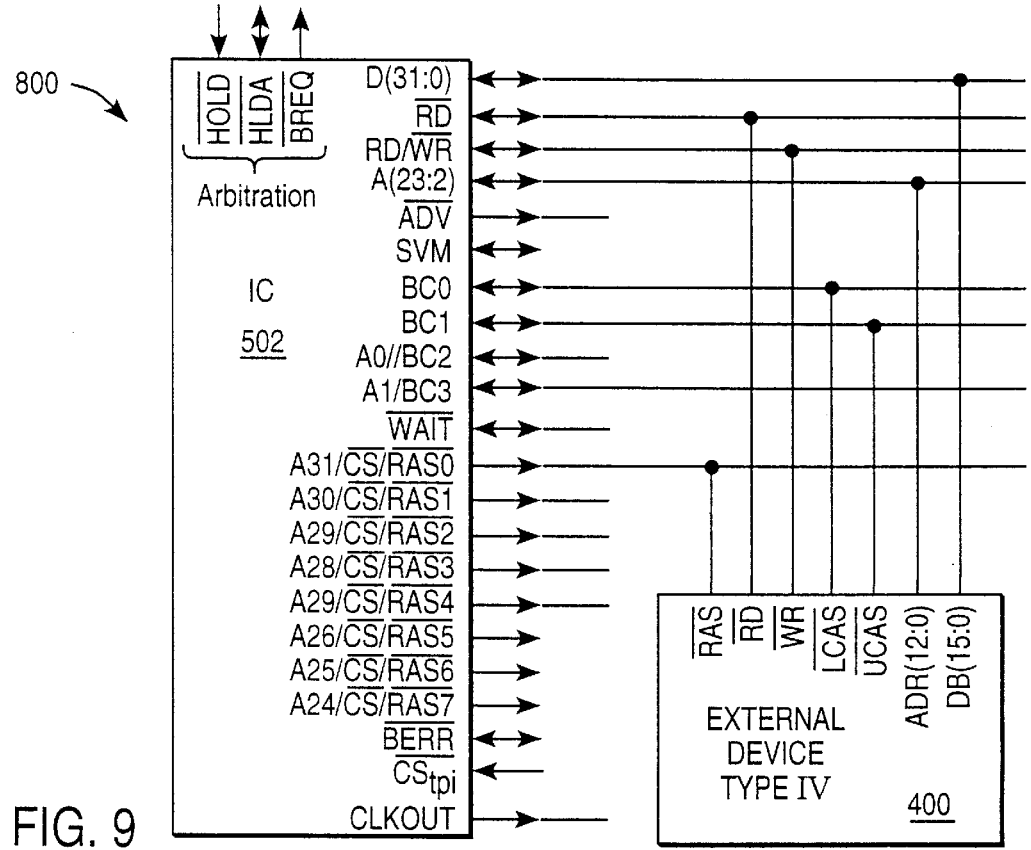
FIG. 9 is a diagrammatic representation of the microcontroller of FIG. 6 that is coupled with a Type IV external device in accordance with one embodiment of the present invention.

FIG. 9 is a diagrammatic representation of the microcontroller 502 of FIG. 6 that is coupled with a Type IV external device 400 in accordance with one embodiment of the present invention. As shown, one of the RAS! pins of the microcontroller 502 is coupled to the CS! pin of the external device 400, the RD! pin of the microcontroller 502 is coupled to the RD! pin of the external device 400, the address pins A2 through A14 are coupled to the address pins A0 through A12 of the external device 400, and the data pins D15 through D0 are coupled to the data pins D15 through D0 of the external device 400.

The BC0 and BC1 pins of the microcontroller 502 are coupled to the lower column address strobe (LCAS) pin and the upper column address strobe (UCAS) pin of the external device 400. The BC0 and BC1 may be configured to provide UCAS and LCAS signals to the external device 400.

Although the present invention is described in terms of providing UCAS and LCAS functions to Type IV external devices, of course, some Type IV external devices have different requirements, such as a single CAS signal or more than two CAS signals. Thus, the microcontroller 502 may be configured to provide any suitable number of CAS signals such that the interface requirements of a particular Type IV external device are met.

Figure 10:
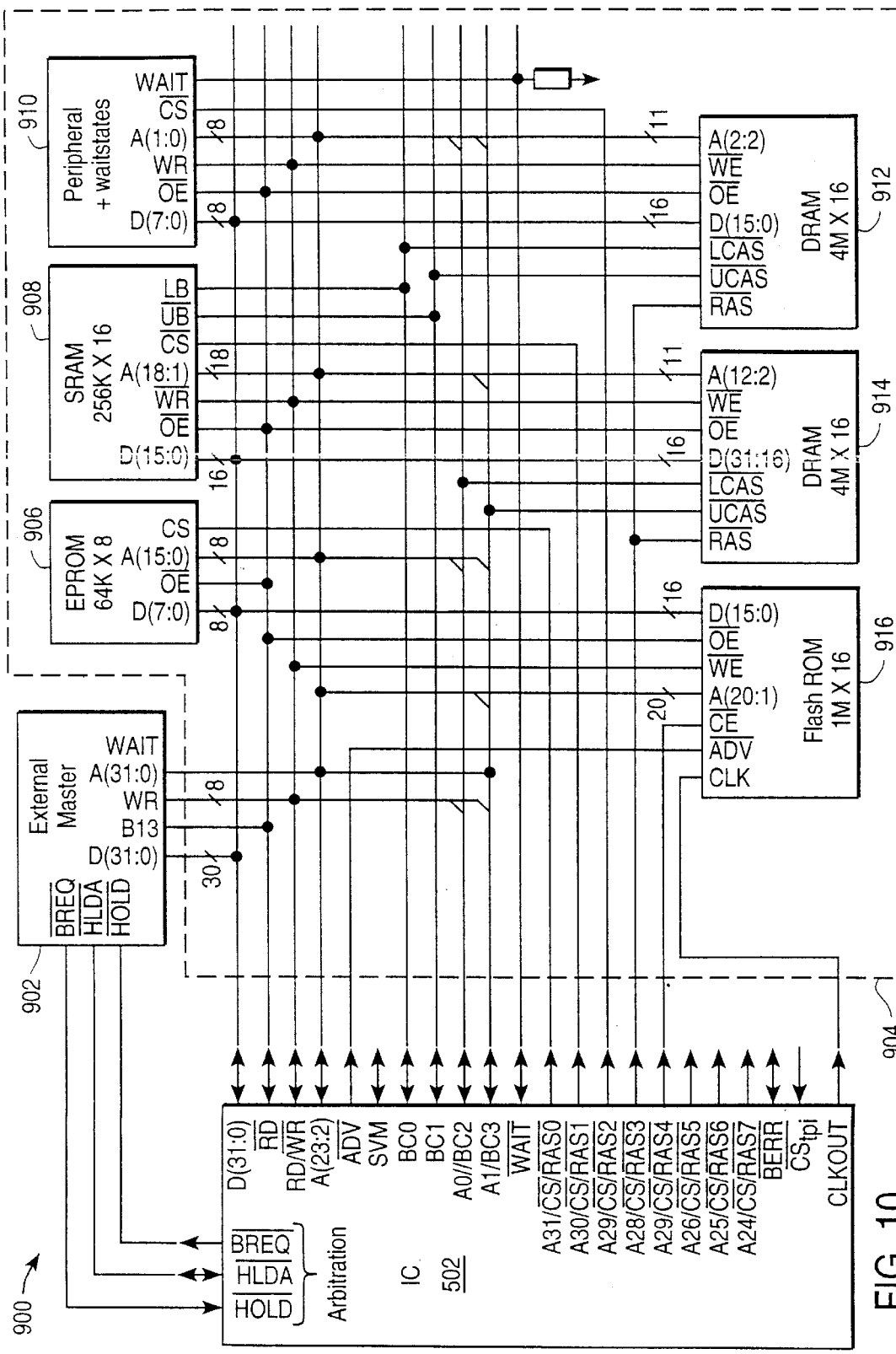
FIG. 10 is a diagrammatic representation of the microcontroller of FIG. 6 that is coupled with a plurality of external devices in accordance with one embodiment of the present invention.

FIG. 10 is a diagrammatic representation of the microcontroller 502 of FIG. 6 that is coupled with a plurality of external devices 904 in accordance with one embodiment of the present invention. As shown, the microcontroller 502 is coupled with four Type I external devices (906, 908, 910, and 916), two Type IV external devices (912 and 914), and an external master device 902.

The microcontroller 502 includes a plurality of device enabling pins (e.g., A31/CS!/RAS0! through A24/CS!/RAS7!). Each device enabling pin may be configured to enable a particular external device by providing chip select or row address strobe signals. Additionally, each device enabling pin may be multiplexed with other microcontroller 502 functions that are provided when the chip select and RAS functions are unused. As shown, the device enabling pins are multiplexed with address signals (e.g., A31 through A24).

Preferably, external devices are coupled to the device enable pins of the microcontroller 502 in a descending order for the multiplexed address pins (A31 to A24) and an ascending order for the CS or RAS function (CS!/RAS0! to CS!/RAS7!). This ordering allows the least significant bits of the multiplexed address pins to be used as address pins when the pins are not used for CS or RAS functions. As shown, CS!/RAS0! through CS!/RAS4! are coupled with the external devices. For example, CS!/RAS0! is coupled with a CS! pin of external device 906, and CS!/RAS3! is coupled with a RAS! pin of external device 914. CS!/RAS5! through CS!/RAS7! are left unused, but may be configured to interface with relatively large sized external devices (e.g., that require one or more of addresses A24 through A26).

Additionally, each device enable pin may be coupled with more than one external device such that the commonly coupled external devices may be used together. As shown, the CS!/RAS3! pin of the microcontroller 502 is coupled with both RAS! pins of external devices 914 and 912. In this example, the external devices 912 and 914 are DRAM devices that each include 4M by 16 bits of data. When accessed together, the DRAM devices provide 4M by 32 bits of data.

The byte control pins BC0 through BC3 of the microcontroller 502 are used to select between upper and lower bytes of data within the two DRAM devices 912 and 914. As shown, the BC0 pin of the microcontroller 502 may be configured to enable the lower byte (LCAS) of external device 912, and the BC1 pin may be configured to enable the upper byte (UCAS) of external device 912. Likewise, the BC2 pin may be configured to enable the lower byte (LCAS) of external device 914, and the BC3 pin may be configured to enable the upper byte (UCAS) of external device 914. Thus, each byte of data from external devices 912 and 914 may be accessed independently by the byte control pins BC0 through BC3 of the microcontroller 502.

The byte control signals BC2 and BC3 may also be configured to provide address signals to external devices. As shown, BC2 and BC3 provide address signals A1 and A0 to external device 906. Since external device 906 is an eight bit device, address signals A1 and A0 are required to select a particular byte of data within external device 906. Similarly, BC2 and BC3 provide address signals A0 and A1 to external device 910, which is also an eight bit device.

As shown, BC0 and BC1 may be configured to provide byte selection functions for the external devices. For example, since external device 908 is a two byte device and is configured to require byte selection, two byte selection signals BC0 and BC1 are required to access one or both bytes of external device 908. Thus, BC0 and BC1 may be configured to provide byte selection, and BC3 pin may be configured to provide address signal A1 to external device 908. Note that external device 908 does not require address signal A0. Similarly, the BC3 pin may be configured to provide address signal A1 to external device 916, which is a two byte device. Note that since external device 916 does not allow byte selection, no other byte control pins (besides BC3) are provided by the microcontroller 502 to external device 916.

The microcontroller 502 may also be arranged to interface with other types of devices, in addition to memory devices 906 through 916. As shown, the microcontroller 502 is also coupled with external master 902. External master 902 is configured to control ownership of the bus 904. In other words, external master 902 indicates when the bus 904 is available for the microcontroller's 502 use. For example, a HOLD! pin of the external master 902 is coupled with a HOLD! pin of the microcontroller 502. This HOLD! pin is used to enable the microcontroller 502 to access bus 904.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, some external devices do not require a write input (e.g., an EPROM device), and, thus, the microcontroller may be configured to not provide a write function. Accordingly, the present embodiments are to be considered as illustrative and not restrictive, and the invention is not to be limited to the details given herein, but may be modified within the scope and equivalents of the appended claims.

What is claimed is:

1. A semiconductor device comprising:
   an external bus unit arranged to receive a selected address location selected from a group of address location consisting of:
   a first set of address locations associated with a first external device configured to receive a first set of signal(s) selected from a group of signals consisting of (i) a read enable signal and a write enable signal, (ii) a combined read and write enable signal, (iii) a read enable signal and a pair of byte write enable signals, and (iv) a row address strobe (RAS) signal and a column address strobe (CAS) signal,
   a second set of address locations associated with a second external device configured to receive a second set of signal(s) selected from the group consisting of (i) a read enable signal and a write enable signal, (ii) a combined read and write enable signal, (iii) a read enable signal and a pair of byte write enable signals, and (iv) a row address strobe (RAS) signal and a column address strobe (CAS) signal, and
   a third set of address locations associated with a third external device configured to receive a third set of signal(s) selected from the group consisting of (i) a read enable signal and a write enable signal, (ii) a combined read and write enable signal, (iii) a read enable signal and a pair of byte write enable signals, and (iv) a row address strobe (RAS) signal and a column address strobe (CAS) signal, wherein the first, second, and third set of signals are different from each other; and
   a plurality of I/O pins configurable for interfacing with the first, second, and/or third external device,
   wherein the external bus unit is further arranged to output at least one of
   the first set of signals when the selected address location is within the first set of address locations,
   the second set of signals when the selected address location is within the second set of address locations, and
   the third set of signals when the selected address location is within the third set of address locations.

2. A semiconductor device as recited in claim 1, further comprising a look-up table that provides external device information for the first, second, and third external devices to the external bus unit associated with each set of address locations such that the external bus unit may selectively output the first, second, or third set of signals based on the selected address location.

3. A semiconductor device as recited in claim 1, wherein the external bus unit is further arranged to output the first set of signals at various timing values, output the second set of signals at various timing values, and output the third set of signals at various timing values.

* * * * *